M. THOMSEN.
CHILD'S VEHICLE.
APPLICATION FILED JAN. 31, 1916.
1,211,897.
Patented Jan. 9, 1917.
2 SHEETS—SHEET 1.
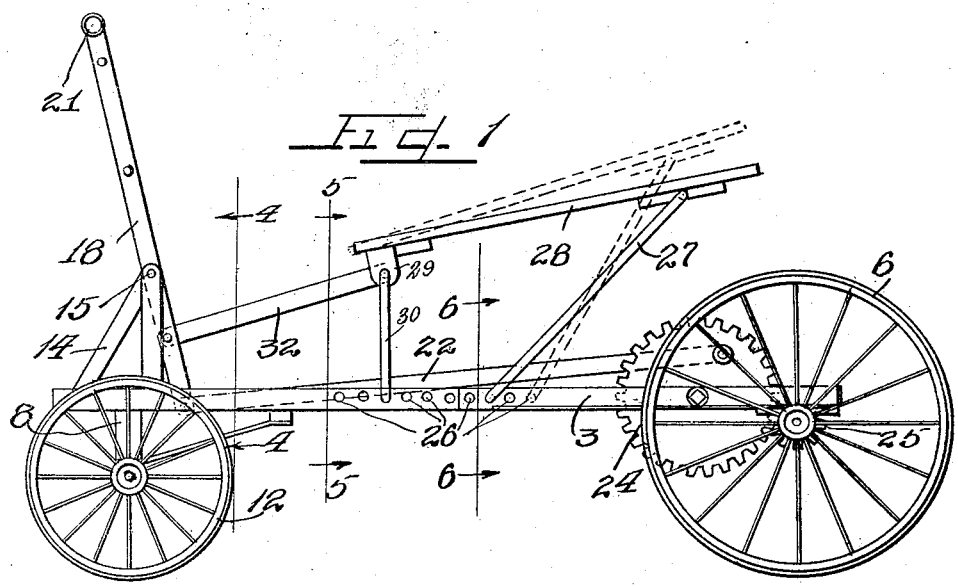
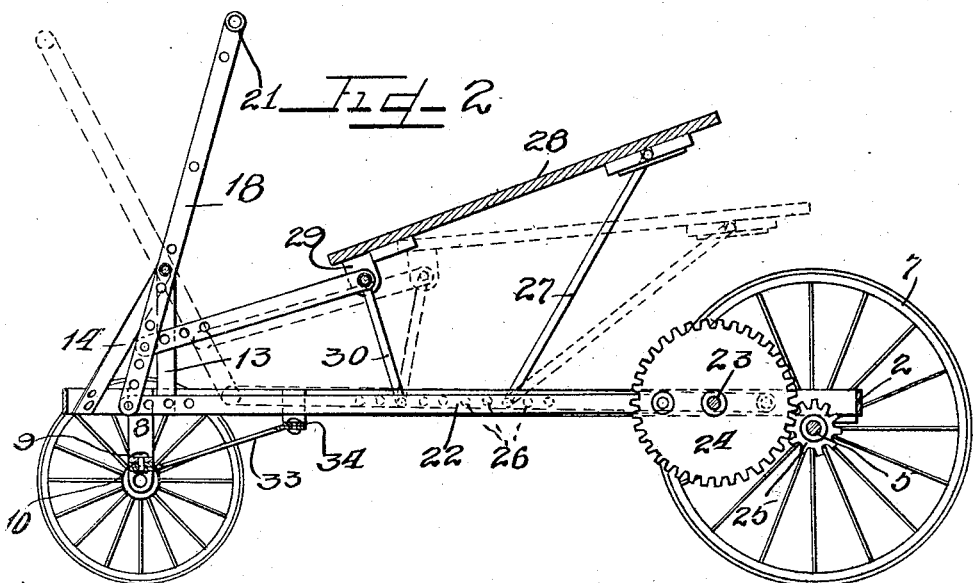

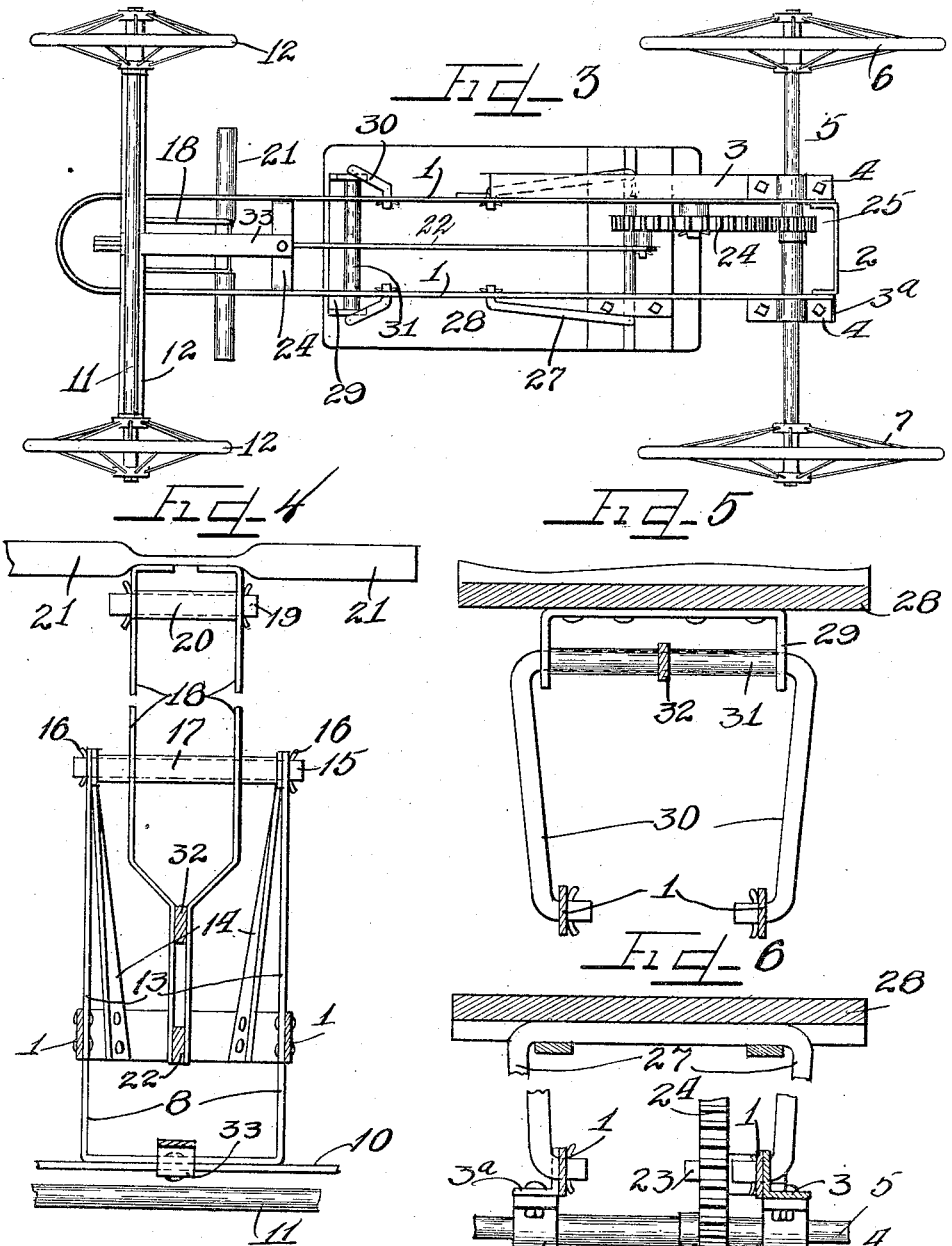

UNITED STATES PATENT OFFICE.

MAX THOMSEN, OF CHICAGO, ILLINOIS.

CHILD'S VEHICLE.

1,211,897. Specification of Letters Patent. Patented Jan. 9, 1917.

Application filed January 31, 1916. Serial No. 75,266.

*To all whom it may concern:*

Be it known that I, MAX THOMSEN, a citizen of the United States, and a resident of the city of Chicago, in the county of Cook and State of Illinois, have invented certain new and useful Improvements in Children's Vehicles; and I do hereby declare that the following is a full, clear, and exact description of the same, reference being had to the accompanying drawings, and to the numerals of reference marked thereon which form a part of this specification.

This invention relates to an improved type of child's vehicle adapted to utilize practically all movements of the body in propelling the vehicle, and serving thereby to exercise the body in its many different movements in operating the vehicle. Various types of children's vehicles have been heretofore constructed, certain ones thereof depending upon the reciprocating movement of a hand lever to impart a drive to the wheels of the vehicle, and others utilizing a reciprocating pivotal movement of the seat or supporting platform upon which the weight of the operator is sustained, to propel the vehicle. This invention, however, utilizes a movement of a reciprocating hand lever as well as that of a movable seat or platform in a manner to transmit a drive to the rear wheels of the vehicle so that a very efficient mechanism is provided adapted to be propelled without undue exertion and at the same time exercising practically the entire body of the person operating the same.

It is an object therefore of this invention to construct a child's vehicle wherein a drive is imparted to the wheels of the vehicle through the co-acting reciprocating movements of a hand lever and seat platform to efficiently utilize the movements of the body as well as the dead weight of the body in effecting propulsion of the vehicle.

It is also an object of this invention to construct a child's vehicle provided with a tiltable seat and reciprocating hand lever interconnected to transmit a drive to a connecting rod which actuates gearing to impart a drive to the wheels of the vehicle.

It is furthermore an important object of this invention to construct a child's vehicle wherein a drive is imparted to the wheels by mechanisms driven due to reciprocating movements imparted by an operator to the seat or hand lever of the device.

It is finally an object of this invention to construct an improved type of child's vehicle provided with a plurality of co-acting means for imparting a drive to the vehicle and with the parts and means of the device adjustable to accommodate persons of different stature.

The invention (in a preferred form) is illustrated in the drawings and hereinafter more fully described.

In the drawings: Figure 1 is a side elevation of a child's vehicle embodying the principles of my invention, a different adjustment of certain of the parts being shown in dotted lines. Fig. 2 is a central longitudinal vertical section taken therethrough, with parts shown in elevation and the operation shown in dotted lines. Fig. 3 is a bottom plan view of the vehicle. Fig. 4 is a detail section taken on line 4—4 of Fig. 1. Fig. 5 is a detail section taken on line 5—5 of Fig. 1. Fig. 6 is a detail section taken on line 6—6 of Fig. 1.

As shown in the drawings, the frame of the machine consists of a single flat bar of metal bent to U-shape as clearly shown in Fig. 3, to afford side sills 1, and with the rounded end of the frame at the forward end of the vehicle. At the rear end of the frame the ends are rigidly connected by a cross member 2, riveted, brazed, or secured in any suitable manner to the ends of the sills. Riveted or brazed to the side sills 1, at the rear end of the frame, are a long and short angle bar 3 and 3ᵃ, respectively, and bolted through the flanges of the respective angle bars at the extreme rear end thereof, are bearings 4, in which a rear axle 5, is journaled, having one keyed wheel 6, and another journaled wheel 7, thereon. At the front end of the vehicle, a flat bar is bent to U-shape and riveted in vertical position to the sills 1, of the frame, the vertical extensions of said U-bar being denoted by the reference numeral 8. At the central point of the horizontal portion of said U-bar 8, a pivot pin 9, is provided, and connected thereon is a horizontal flat axle bar 10, the ends of which are turned downwardly and afford a support for a front axle 11, journaled upon which are front wheels 12. Riveted in upright position to the side sills 1, adjacent to and at the rear of the U-bar 8, are uprights 13, which are braced by forwardly directed inclined brace bars 14, riveted to the front rounded extension of the vehicle frame. The upper ends of the uprights 13, and brace bars 14, afford a support for a pivot bar or rod 15, held removably therein by split pins 16, at each end thereof. Journaled upon said pivot bar 15, is a sleeve 17, which extends through apertures in the upright bars 18 of a hand lever, and is rigidly secured therein. The bars 18 of the hand lever, are connected and reinforced at their upper ends by a pin 19, extending therethrough, with a spacer sleeve 20, surrounding said pin and disposed between said bars, and a pair of integrally connected hand grips 21, are secured in any suitable manner on the upper end of said bars. The lower ends of said bars 18, are bent inwardly toward one another, the inwardly bent portions being provided with a plurality of apertures therethrough, as clearly shown in Fig. 2. Pivotally connected through one pair of registering apertures in the lower end of said bars 18, is a long connecting rod 22. Secured in any suitable manner through one of the side sills 1, of the frame at the rear end thereof, is a stub shaft 23, on which is journaled a relatively large driving gear 24, to which the rear end of the connecting rod 22, is pivotally and eccentrically connected. Secured upon the rear axle 5, is a small pinion 25, which meshes with said gear 24, to be driven thereby.

A plurality of holes 26, is provided through the associated sills 1, and angle bar 3, of the frame and detachably and pivotally connected through any desired pair thereof is a relatively long U-bar support 27, the upper end of which is pivotally connected beneath the rear end of a platform or seat 28. A bracket 29, is secured beneath the forward end of said platform or seat 28, and journaled therethrough is a short U-bar 30, the lower ends of which are detachably journaled through certain of the apertures 26 provided in the side sills 1.

A sleeve 31, is journaled around the upper portion of the U-bar 30, between the ends of the bracket 29, and secured upon said sleeve is one end of a connecting rod 32, the forward end of which is connected in any one of the pairs of apertures of the inwardly bent ends of the bars 18. An operator using the machine sits upon the platform 28, and places his feet upon the axle bar 10, adjacent the front wheels 12, to steer the vehicle. The steering pivot connection 9, is reinforced by a rearwardly extending brace bar 33, which is secured to a cross frame member 34, secured in any suitable manner to the sills 1, of the frame.

The operation is as follows: The rotation of the driving gear 24, is effected by the reciprocating movement of the connecting rod 22, and this movement is received directly from the lower end of the pivoted hand lever formed by the bars 18. It is obvious that forward and rearward oscillating movements of the bars 18 by the hands of an operator will serve to reciprocate the connecting rod 22, to drive the driving gear 24. However, this movement of the bars is augmented by movement of the seat or platform upon which the weight of the operator is supported. The seat, as clearly shown, is pivotally mounted upon the U-frames 27 and 30, so that the seat is capable of a rising and falling reciprocating movement, and this movement is imparted to the bars 18, by the connecting rod 32. The connections are such that the bars 18, upon being pulled rearwardly by an operator, due to the fact that the connecting rod 32, for the seat is connected below the pivot of the handle-bar, the seat is elevated. Only a very little of the weight of the operator, however, is carried thereby, owing to the fact that pull upon the bars 18, serves to sustain a certain portion of the weight and, the operator having his feet braced upon the axle bar 10, of the front wheels, a certain amount of his weight is also sustained thereon. Under extreme conditions the operator can practically stand upon the axle bar while pulling rearwardly upon the bars 18, so as to entirely relieve the platform 28, of his weight. However, upon the outward movement of the bars 18, the seat acts as a brace to resist such a thrusting movement by the operator, and as a consequence practically the entire weight of the operator, together with the force due to the outward thrust on the hand lever, is imparted to the seat or platform 28. This application of weight and force occurring at a time when the platform is capable of downward movement, considerable driving effect is gained thereby, and transmitted through the connecting rod 32, to the lower end of the bars 18, for transmission to the driving means for the wheels of the vehicle. The leverage on the connecting rod 22, by the bars 18, may be changed by changing the pivotal connection thereof in the pairs of holes provided in the handle-bar. Likewise, the field of operation of the bars 18, may be changed by changing the pivotal connection of the bars 18, in the pairs of holes provided in the forward end of the connecting rod 22. It is clear, therefore, that a double adjustment may be effected at this point of pivotal connection. Likewise, the pivotal connection between the bars 18, and the connecting rod 32, for the seat, may be varied by using different pairs of apertures provided in the forward end of said connecting rod 32. The field of movement of the seat 28, may also be varied by shifting the pivotal connection of the U-bar 27, in the pairs of apertures provided through the associated sills 1, and angle bars 3. It is obvious, therefore, that the machine may be adjusted for use by persons of different stature, according to the different leg and arm lengths thereof to provide for the most convenient and efficient operation of the vehicle.

I am aware that various details of construction may be varied through a wide range without departing from the principles of this invention, and I therefore do not purpose limiting the patent granted otherwise than necessitated by the prior art.

I claim as my invention:

1. In a device of the class described, a frame, wheels supporting the same, a transmission for driving said wheels, a pivoted hand lever, means directly connecting said hand lever with said transmission to drive the latter, a movably mounted seat, and connections between said seat and said hand lever whereby a co-acting driving effect is gained by the movement of the hand lever and seat.

2. In a device of the class described, a frame, wheels supporting the same, a transmission for driving said wheels, a hand lever pivoted intermediate its length, a connecting rod pivoted to one end of said hand lever and to said transmission, a seat, pivoted U-supports for said seat, and a connecting rod between said hand lever and said seat whereby a co-acting driving effect is gained by the movement of the hand lever and seat.

In testimony whereof I have hereunto subscribed my name in the presence of two subscribing witnesses.

MAX THOMSEN.

Witnesses:
CHARLES W. HILLS, Jr.,
EARL M. HARDINE.

Copies of this patent may be obtained for five cents each, by addressing the "Commissioner of Patents, Washington, D. C."